D. BROWN.
FLUID COUPLING.
APPLICATION FILED AUG. 25, 1916.
1,239,345.
Patented Sept. 4, 1917.
2 SHEETS—SHEET 1.
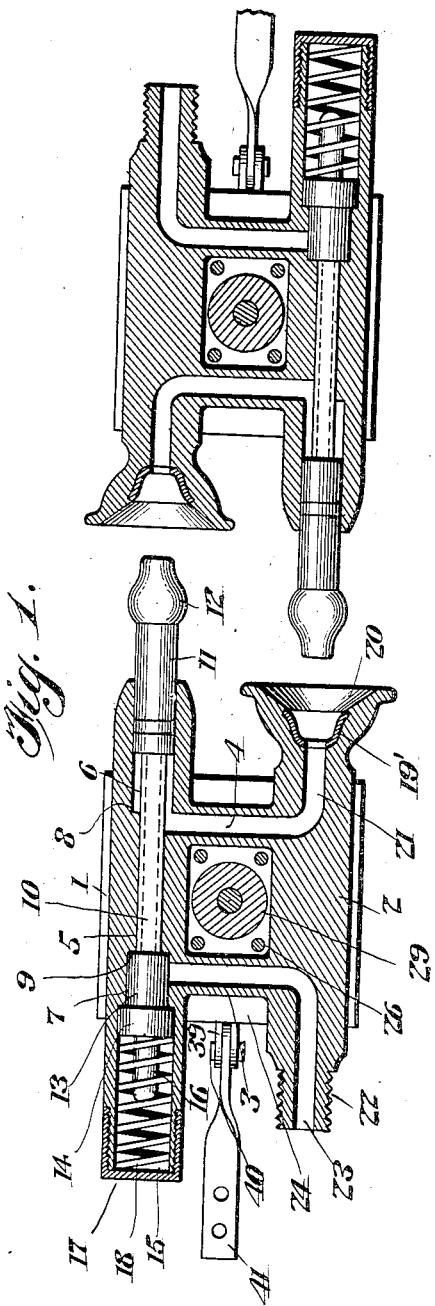
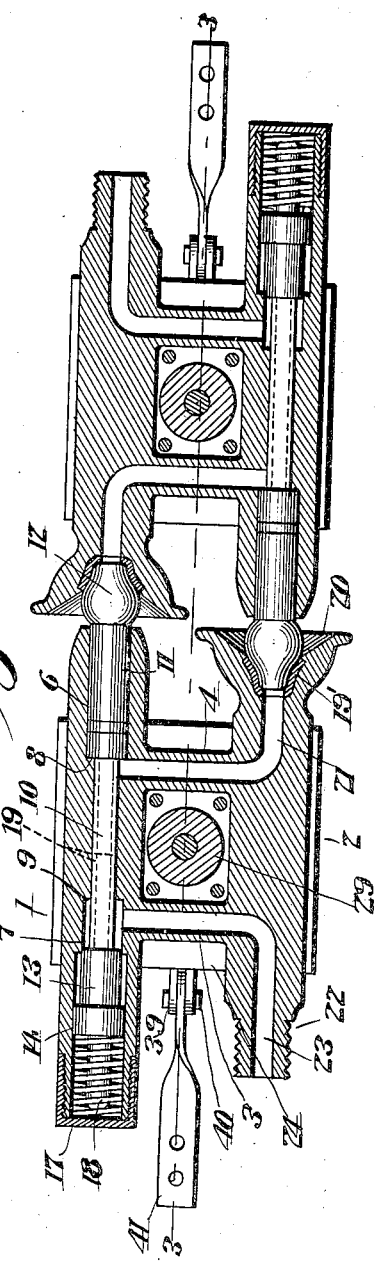
Witnesses
J. R. Heinrichs
Inventor
David Brown
By Victor J. Evans
Attorney

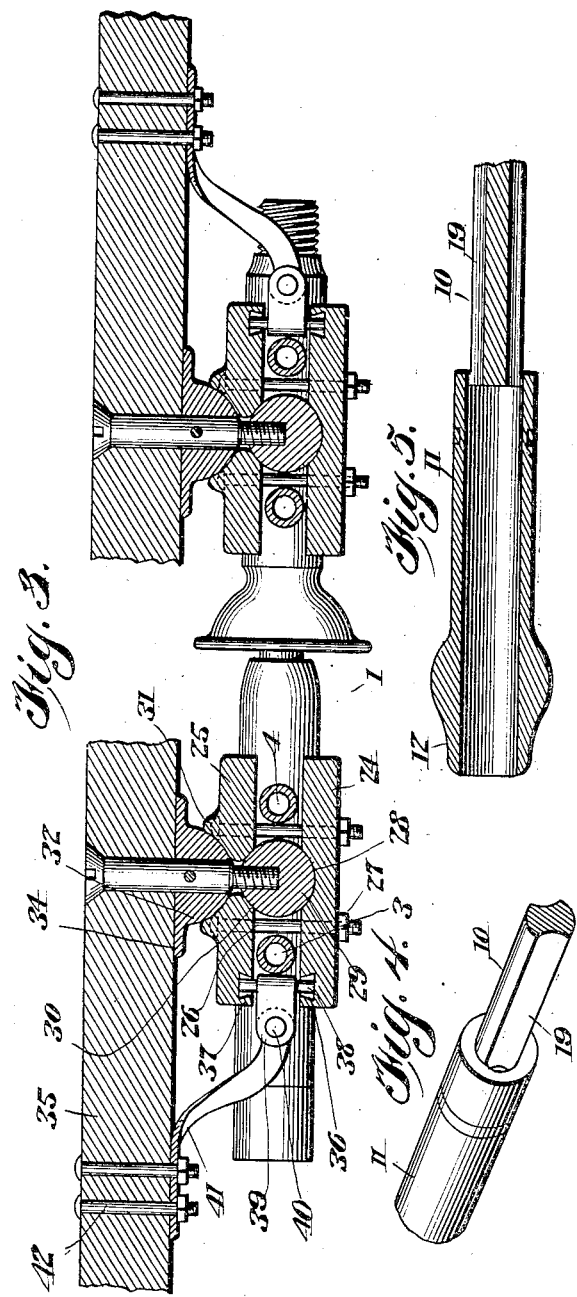

UNITED STATES PATENT OFFICE.

DAVID BROWN, OF ELDORADO, ILLINOIS.

FLUID-COUPLING.

1,239,345.   Specification of Letters Patent.   Patented Sept. 4, 1917.

Application filed August 25, 1916. Serial No. 116,882.

*To all whom it may concern:*

Be it known that I, DAVID BROWN, a citizen of the United States, residing at Eldorado, in the county of Saline and State of Illinois, have invented new and useful Improvements in Fluid - Couplings, of which the following is a specification.

This invention relates to improvements in couplings for the conducting pipes of air or steam systems employed upon railway coaches or the like, and the primary object of the invention is to simplify and improve the existing art by producing an apparatus of this character which shall be of a simple construction, easily installed and which shall be automatic and positive in action.

With the above and other objects in view the improvement resides in the construction, combination and arrangement of parts set forth in the following specification and falling within the scope of the appended claims.

In the drawings:

Figure 1 is an approximately central horizontal sectional view through coupling members constructed in accordance with the present invention showing the same disconnected, Fig. 2 is a similar view but illustrating the members connected, Fig. 3 is a central vertical longitudinal sectional view approximately on the line 3—3 of Fig. 2, Fig. 4 is a sectional perspective view illustrating the construction of the stem connected with the nozzle and valve members, Fig. 5 is a central longitudinal sectional view through one of the nozzles and stems therefor.

While the main body portion of the improvement may be constructed of a plurality of connected pipe members, the same, as illustrated by the drawings, is preferably in the nature of a block or casting and includes two longitudinally arranged members 1 and 2 respectively that are connected, adjacent their ends, by tubular members 3 and 4 respectively. The members 1 and 2 are preferably rounded in cross section and the member 1 is provided with a bore or passage extending longitudinally therethrough, the central portion of the bore, indicated by the numeral 5, or that portion thereof disposed between the pipe or tubular members 3 and 4 being smaller than the portions 6 and 7, extending outwardly from the said central portion of the bore. It will thus be noted that shoulders 8 and 9 respectively are provided between the passages 6 and 7 and the passage 5 of the bore, the shoulder 8 being disposed in a line with the outer wall of the pipe or tubular member 4, and the shoulder 9 being disposed inwardly of the inner wall of the pipe or tubular member 3. The central portion of the bore is adapted to receive the stem 10, provided between the hollow shank 11 of a nozzle member 12 and a slidable valve member 13. The valve member 13 is preferably provided with a head 14, the passage 7 having its outer end enlarged, as at 15, to receive the said head, and preferably the valve 13 and the head 14 thereof are removably connected with the stem 10 so that a portion of the stem, indicated for distinction by the numeral 16, projects outwardly of the head 14, the end of the tubular passage receiving the valve 13 and the head 14 thereof is provided with exterior threads to receive the interior threads upon a flange cap 17, and exerting a pressure between this cap 17 and head 14 of the valve 13 is a helical spring 18 which normally forces the valves against the shoulder 9 and consequently closes the passage in the pipe or tubular member 3. The spring 18 also projects the shank 11 to force the nozzle 12 upon the end thereof outwardly of the passage 6 of the member 1. The shank 10 has two of its sides grooved longitudinally, as at 19, the said grooves providing passages for the fluid which is let in through the pipe or tubular member 4 to permit of the same flowing through the tubular member 3 when the valve is unseated, in a manner which will presently be described. The nozzle 12 is in the nature of a cone-shaped member whereby the same may be firmly seated upon a hollow conical gasket 19′ provided in the bell - shaped mouth 20 formed upon one end of the member 2 and having a passage 21 which communicates with the passage in the tubular member 4. The opposite end of the member 2 is threaded, as at 22, to receive the flexible hose connected with the steam or air brake system and the member 22 is provided with a passage 23 which communicates with the passage in the pipe member 3.

Disposed upon the opposite sides or faces of the member just described, and having longitudinal grooves to receive the tubular longitudinal members 1 and 2 thereof are plates 24 and 25 respectively. These plates also inclose the branch or tubular members 3 and 4 but do not contact with the same, as the said members 3 and 4 are of a less cross sectional diameter than the members 1 and 2, and the plates 24 and 25 are provided with bolt openings disposed adjacent to the juncture of the portions 3 and 4 with the portions 1 and 2 of the main casting, and through these openings are passed securing elements in the nature of bolts 26 having securing nuts 27. The plate 24 upon its upper surface is centrally provided with a rounded or dished concavity 28 to receive one end of a solid spherical member 29, the opposite end of the said spherical member being received in a similar depression 30 in the underface of the plate 25. The outer face of the plate 25 is provided with an annular boss 31 that is centrally dished or provided with a rounded depression to receive the rounded end 32 of a bearing member 34 that is secured, as illustrated in Fig. 3, to the underface of the draw bars 35 for the cars. By this arrangement it will be noted that the device is permitted a partial rotary as well as a partial swinging movement in a vertical direction.

The plates 24 and 25, outward of the portions thereof which inclose the tubular member 3, are each provided with an alining substantially dove-tailed depression 36 and 37 respectively and within these depressions is received a pin 38 having loosely arranged thereon a sleeve or clip 39 that projects outwardly between the plates and which is pivotally connected, as at 40, with the strap member 41 that is secured, as at 42, to the underface of the draw bar 35.

As shown in Fig. 1 of the drawings two of the coupling members are employed, one upon each of the cars, and the nozzle 12 of one of the coupling members is disposed to aline with the bell-shaped mouth 20 of the other coupling. As the cars are moved toward each other the cone-shaped nozzles will be received within the bell-shaped mouths 20 and contact with the cup-shaped gaskets 19' arranged within the said mouths. The movement of the cars toward each other causes the nozzle members 11 to be forced inwardly of the passages provided for the shanks thereof, and as a consequence the stems 10 move the valves 13 against pressure of the springs 18 off their seats permitting steam or air to flow through the passages 21, 4, 5, 3 and 23, through the flexible hose members connected with the device. It will be apparent that when the cars are drawn away from each other the springs 18 will return the valves 13 to their seated positions to project the nozzles 12 so as to close the communication between the passages.

Having thus described the invention, what I claim is:

1. In an automatic fluid brake coupling, a casting comprising spaced longitudinal members and transverse members connecting the longitudinal members, one of said longitudinal members having a passage extending therethrough, each of the transverse members having passages communicating with the passage in the said longitudinal member, the other longitudinal member having one of its ends provided with a bell-shaped mouth having a compressible gasket therein and being provided with a passage which communicates with the passage in one of the transverse members, the opposite end of said second mentioned longitudinal member being exteriorly threaded and being provided with a passage communicating with the second transverse member, a valve in the passage of the first mentioned longitudinal member, spring members for forcing the valve in one direction to close the passage in one of the transverse members, a grooved stem for the valve, a shank connected with the stem and projecting through one of the ends of the passages, and said hollow shank having its outer end provided with a cone-shaped nozzle, as and for the purpose set forth.

2. In an automatic fluid brake, two spaced longitudinal pipe members, two spaced transverse pipe members connecting the same, one of said longitudinal pipes having its bore reduced between the said transverse pipe members, providing shoulders one inward of the bores of one of the transverse pipe members and one outward of the bore of the other transverse pipe member, a slidable valve in the larger bore at one of the ends of said longitudinal member and normally closing the bore of one of the transverse pipe members, a spring for this valve, a cap on the end of the pipe member contacted by the spring, a grooved stem for the valve extending through the reduced bore of said pipe member, a hollow shank connected to the end of said stem and projecting through the end of said flexible member, a nozzle member for the shank, a second longitudinal pipe member having its end opposite the nozzle formed with a cone-shaped mouth, and a hollow frusto-conical compressible gasket within the said mouth, as and for the purpose set forth.

In testimony whereof I affix my signature.

DAVID BROWN.